No. 616,766. Patented Dec. 27, 1898.
R. BRUCE.
ROTARY ENGINE.
(Application filed Dec. 27, 1897.)

(No Model.) 2 Sheets—Sheet 1.

WITNESSES: Francis McAuliffe, A. M. Wilson

INVENTOR Robert Bruce.
BY Henry C. Evert ATTORNEY.

No. 616,766. Patented Dec. 27, 1898.
R. BRUCE.
ROTARY ENGINE.
(Application filed Dec. 27, 1897.)

(No Model.) 2 Sheets—Sheet 2.

WITNESSES:
Francis H. Anglin
A. M. Wilson

INVENTOR
Robert Bruce
BY
Henry C. Evert
ATTORNEY.

UNITED STATES PATENT OFFICE.

ROBERT BRUCE, OF ALLEGHENY, PENNSYLVANIA.

ROTARY ENGINE.

SPECIFICATION forming part of Letters Patent No. 616,766, dated December 27, 1898.

Application filed December 27, 1897. Serial No. 663,507. (No model.)

*To all whom it may concern:*

Be it known that I, ROBERT BRUCE, a citizen of the United States of America, residing at Allegheny, in the county of Allegheny and State of Pennsylvania, have invented certain new and useful Improvements in Rotary Engines, of which the following is a specification, reference being had therein to the accompanying drawings.

This invention relates to certain new and useful improvements in rotary engines, and has for its object to construct an engine of this class provided with a piston or power-wheel which will fit closely to the inner surface of the cylinder during its entire revolution and forming a perfectly steam-tight connection therewith.

The novel features of my invention reside in the construction and arrangement of the circular piston or power-wheel and mounting the same on the driving-shaft within an elliptical-shaped cylinder and in providing this piston or power-wheel with sliding plungers or valves which are engaged by the steam and through its action on the same causes the piston or power-wheel to revolve.

The invention aims, further, to construct a rotary engine whereby the entire force of the steam may be employed and whereby the exhaust-steam may be withdrawn rapidly and completely.

With these objects in view my invention resides in the various details of construction and in the combination of the parts, as will be hereinafter more fully described, and specifically pointed out in the claims.

In describing the invention in detail reference is had to the accompanying drawings, forming a part of this specification, and wherein like letters of reference indicate similar parts throughout the several views, in which—

Figure 1:
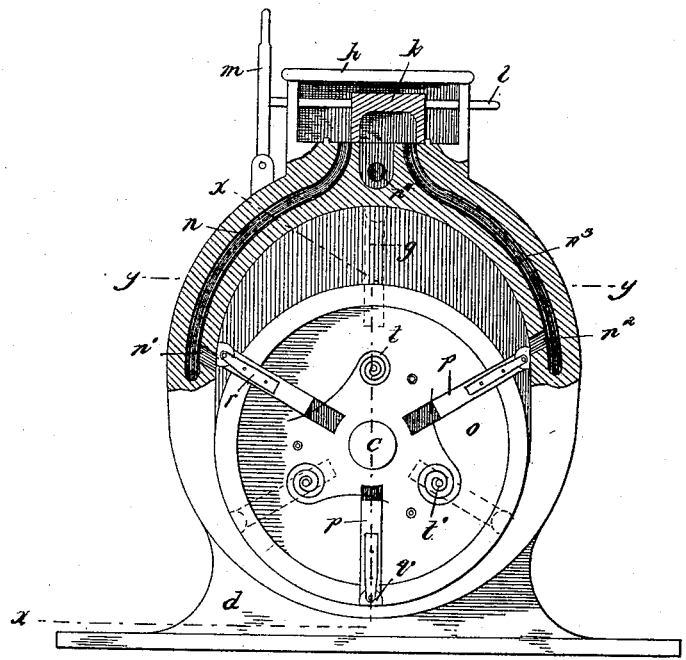
Figure 2:
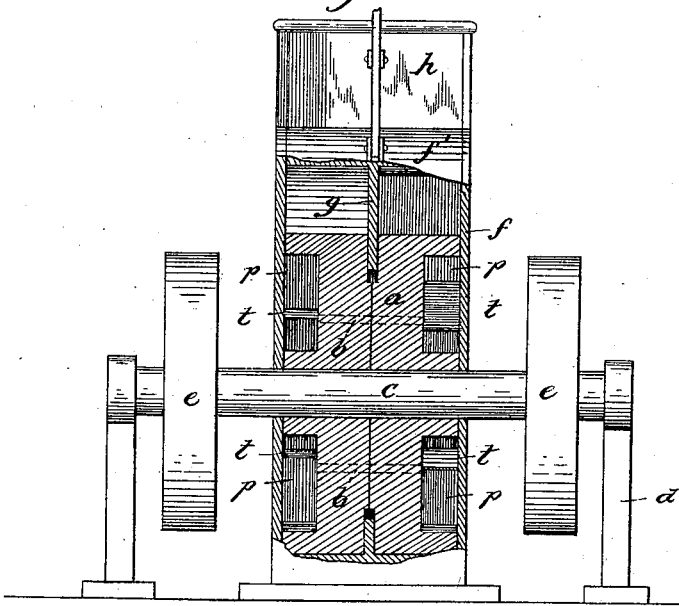
Figure 3:
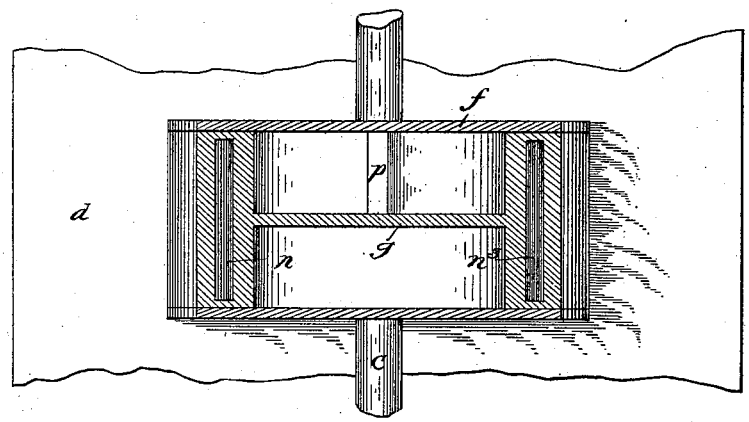
Figure 4:
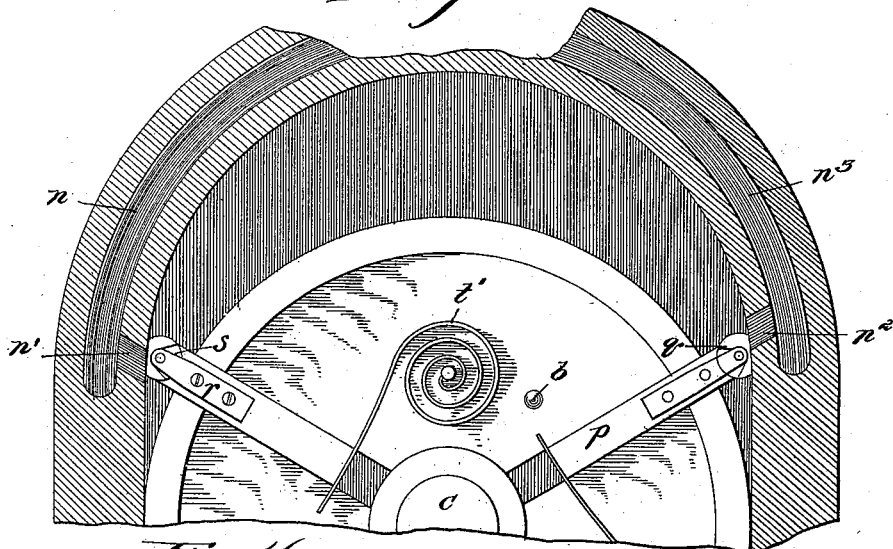
Figures 5, 6:
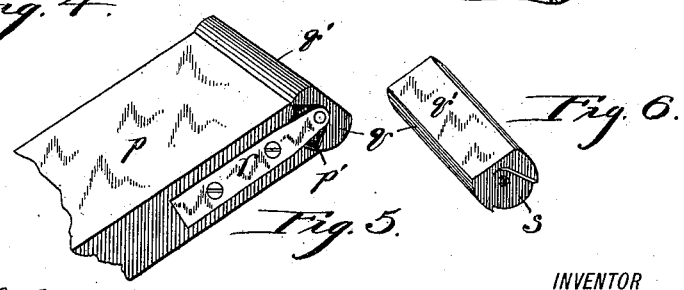

Figure 1 is a side view of my improved engine with one of the side plates removed and the upper half of the engine in section. Fig. 2 is a sectional view taken on the line X X of Fig. 1. Fig. 3 is a horizontal sectional view taken on the line Y Y of Fig. 1. Fig. 4 is a sectional view of a portion of the cylinder, showing a portion of the piston or power-wheel. Fig. 5 is a perspective view of a portion of one of the sliding plungers. Fig. 6 is a similar view of one of the swiveled shoes or packing-blocks.

Referring now to the drawings by reference-letters, $a$ indicates the piston or power-wheel, which is composed of two sections rigidly secured together by bolts $b$ or other suitable means and which are mounted upon the power-shaft $c$, the latter having suitable supporting-standards $d$ and carrying pulleys $e$. This power or drive shaft $c$ is eccentrically mounted within the cylinder $f$, the latter being elliptical in form and being divided into two compartments by means of a partition $g$, carried by the rim $f'$, the said partition engaging in a groove provided therefor on the inner face of the two sections composing the piston or power-wheel. Arranged over the cylinder is an ordinary steam-chest $h$, within which is arranged the sliding valve $k$, which is operated by means of the valve-rod $l$, connected thereto and to a lever $m$, that is suitably supported from the cylinder at a point in close proximity to the steam-chest. The inlet-port $n$ communicates with the aforesaid steam-chest and with the port $n'$, that communicates with the cylinder, and at the opposite side is arranged a port $n^2$, that communicates with the exhaust-port $n^3$, the latter also communicating with the steam-chest through this valve and with the final exhaust $n^4$.

The reversal of the engine will of course be accomplished by the changing of the valve to the reverse position to that shown in the drawings, which will of course be readily understood.

The piston or power-wheel is adapted to form a steam-tight connection with the lower portion of the cylinder, and each of the two sections forming this piston or power-wheel is provided with radial grooves $o$, in which are arranged sliding plungers $p$, having a circular groove $p'$ in their outer ends in which is arranged and adapted to operate a three-quarter-round shoe or packing-block $q$, that is retained in its position by means of straps $r$, rigidly secured to the edges of the sliding plungers and pivotally connected to the ends of said shoe or packing-block, the said ends being recessed, as shown at $s$, so that the face of the straps will be flush with the ends of the shoe or packing-block. These plungers are held in engagement with the inner face of the cylinder at all times by means of stiff tension-springs $t$, which are fastened to the pin $t'$, carried by the power-wheel, the free ends of said springs engaging the free ends of the sliding plungers or valves. Thus when the valves are on the upward movement these springs will force the plungers or valves outwardly and will then permit of the same being compressed within their radial grooves during the downward movement of the same. The flat face $q'$, formed on the shoe or packing-block $g$, will serve to make a perfectly steam-tight connection with the inner face of the cylinder during the entire revolution of the piston or power-wheel. As the steam is admitted into the chest from any suitable supply the same passes through the ports $n\ n'$ and escapes into the cylinder, where it engages the plunger or plungers, and through its action on the same causes the power-wheel or piston to revolve until that plunger or plungers upon which the action of the steam is being exerted passes the port $n^2$, at which time the exhaust takes place. At this time, however, it will be observed that another of the plungers has passed the port $n$ on the opposite side of partition, and is therefore receiving the steam to continue the revolution of the piston or power-disk, and by dividing this cylinder into two compartments and arranging these plungers or valves diametrically opposite on the two sections one of the plungers is always in position for receiving the active steam, thereby preventing a dead-center on the engine.

It will be noted that various changes may be made in the details of construction without departing from the general spirit of my invention.

Having fully described my invention, what I claim as new, and desire to secure by Letters Patent, is—

1. In a rotary engine, the combination of an elliptical-shaped cylinder, a power-shaft mounted in said cylinder, a piston rigidly mounted on said power-shaft within the cylinder, said piston consisting of two independent sections rigidly connected together, a partition formed integral with the inner face of the rim and extending into the piston to divide the cylinder into two separate compartments, a steam-chest, a slide-valve arranged therein, inlet and exhaust ports communicating with the separate compartments of the cylinder and with the steam-chest, each section of the piston being provided on its outer face with radial grooves, sliding plungers arranged in said grooves, each of said plungers having a packing-block swiveled on its outer end and held normally in engagement with the inner face of the rim by means connected to the piston, substantially as shown and described.

2. In a rotary engine, the combination of an elliptical cylinder, a piston composed of two sections rigidly connected together, a partition engaging into said piston and dividing the cylinder into two equal compartments, a steam-chest, a slide-valve arranged therein, inlet and exhaust ports for each of said compartments, sliding plungers arranged in the outer face of each section of the piston, said plungers on the one side of the piston being arranged diametrically opposite to those on the opposite side, packing-blocks swiveled in the outer ends of said plungers, and springs secured to the piston and engaging the inner ends of said plungers for holding the packing-blocks at all times in engagement with the periphery of the cylinders, substantially as shown and described.

3. In a rotary engine, the combination of an elliptical-shaped cylinder, a power-shaft mounted in said cylinder, a rotary piston formed in two sections secured together and each of which is formed on its outer face with radial grooves, the grooves on the face of one section being alternate with the grooves on the other section, a partition dividing said cylinder into two equal compartments, inlet and exhaust ports for said cylinder, sliding plungers arranged in the grooves of each section and having a recess in their outer end, a three-quarter-round packing-block engaging in said recess, straps secured to the plungers and within which the packing-block is journaled, and springs secured to the piston and engaging the inner end of the sliding plungers to hold the packing-blocks at all times in engagement with the periphery of the cylinder, substantially as herein shown and described.

In testimony whereof I affix my signature in presence of two witnesses.

ROBERT BRUCE.

Witnesses:
A. M. WILSON,
J. P. APPLEMAN.